United States Patent
Winandy

(10) Patent No.: US 10,702,791 B2
(45) Date of Patent: Jul. 7, 2020

(54) METHODS AND FACILITIES FOR THERMAL DISTILLATION WITH MECHANICAL VAPOUR COMPRESSION

(71) Applicant: INDUSTRIAL ADVANCED SERVICES FZ-LLC, Ras Al Khaimah (AE)

(72) Inventor: François-Mathieu Winandy, London (GB)

(73) Assignee: INDUSTRIAL ADVANCED SERVICES FZ-LLC, Ras Al Khaimah (AE)

( * ) Notice: Subject to any disclaimer, the term of this patent is extended or adjusted under 35 U.S.C. 154(b) by 114 days.

(21) Appl. No.: 14/908,076

(22) PCT Filed: Jul. 29, 2014

(86) PCT No.: PCT/EP2014/066278
§ 371 (c)(1),
(2) Date: Jan. 27, 2016

(87) PCT Pub. No.: WO2015/014840
PCT Pub. Date: Feb. 5, 2015

(65) Prior Publication Data
US 2016/0158666 A1    Jun. 9, 2016

(30) Foreign Application Priority Data

Jul. 29, 2013    (EP) .................. PCT/EP2013/065933

(51) Int. Cl.
*B01D 1/28*    (2006.01)
*C02F 1/04*    (2006.01)
(Continued)

(52) U.S. Cl.
CPC .............. *B01D 1/2887* (2013.01); *B01D 1/04* (2013.01); *B01D 1/2893* (2013.01); *B01D 3/10* (2013.01);
(Continued)

(58) Field of Classification Search
CPC ...... B01D 1/2887; B01D 1/2893; B01D 1/04; B01D 5/006; B01D 5/0009; B01D 3/10; C02F 1/06; C02F 1/041; C02F 103/08
See application file for complete search history.

(56) References Cited

U.S. PATENT DOCUMENTS 2,760,919 A  *  8/1956  Latham, Jr. .......... B01D 1/2818
                                                      202/185.1
2,899,366 A      8/1959  Hickman
(Continued)

FOREIGN PATENT DOCUMENTS

| FI | WO95/21009 | * 10/1995 | ............... B01D 1/28 |
| FI | WO9521009 | * 10/1995 | ............... B01D 1/28 |

(Continued)

OTHER PUBLICATIONS

RU2450218 Evgenyevich 2012 ENG (English translation) (Year: 2012).*
(Continued)

*Primary Examiner* — Jonathan Miller
*Assistant Examiner* — Gabriel E Gitman
(74) *Attorney, Agent, or Firm* — Duane Morris LLP; Gregory M. Lefkowitz; Jason M. Nolan

(57) ABSTRACT

The invention provides several innovations relative to MVC thermal distillation methods and facilities in order to decrease their specific electricity consumption to values of only 2 to 4 kWh/m3 of distillate produced, as well as their manufacturing costs. The vapour transport system is reduced to its simplest expression and has a practically null total (Continued)

dynamic pressure loss. The compression system including the compressor motor) is completely integrated into the evaporator-condenser, installed in the inlet of the condensation zones, preferably provided with a system preventing overheating of the vapour, and driven at a high speed of rotation. Preferably, the auxiliary equipment is installed in the enclosure in a partial vacuum (hermetic chamber). According to one particular embodiment, the condensation zones have a section that decreases with the path of the vapour. The exchangers on the incoming and outgoing flows are supplied with continuously balanced heat loads. Heat losses are offset by auxiliary heating. Preferably, the facility can be made using a modular concept.

21 Claims, 7 Drawing Sheets

(51) Int. Cl.
| | |
|---|---|
| B01D 5/00 | (2006.01) |
| B01D 3/10 | (2006.01) |
| C02F 1/06 | (2006.01) |
| B01D 1/04 | (2006.01) |
| C02F 103/08 | (2006.01) |

(52) U.S. Cl.
CPC ........... *B01D 5/006* (2013.01); *B01D 5/0009* (2013.01); *B01D 5/0045* (2013.01); *C02F 1/041* (2013.01); *C02F 1/06* (2013.01); *C02F 2103/08* (2013.01); *Y02A 20/128* (2018.01)

(56) References Cited

U.S. PATENT DOCUMENTS

| | | | | |
|---|---|---|---|---|
| 3,236,748 | A * | 2/1966 | Pottharst, Jr. ............ | B01D 1/12 159/27.1 |
| 3,305,454 | A * | 2/1967 | Cowley ................ | B01D 1/2887 202/182 |
| 3,362,468 | A * | 1/1968 | Olson ....................... | F28B 1/02 165/110 |
| 4,353,222 | A * | 10/1982 | Kobayashi ................ | A23L 3/44 62/268 |
| 4,536,258 | A * | 8/1985 | Huhta-Koivisto ....... | B01D 3/04 159/24.3 |
| 4,734,167 | A | 3/1988 | Goeldner | |
| 4,769,113 | A * | 9/1988 | Sears ..................... | B01D 1/221 159/24.2 |
| 5,360,058 | A * | 11/1994 | Koeppl .................. | F28D 15/046 122/366 |
| 5,645,694 | A * | 7/1997 | Stewart .................... | B01D 1/04 159/24.1 |
| 6,695,951 | B1 * | 2/2004 | Bitterly .................. | B01D 1/222 159/13.2 |
| 6,858,150 | B2 * | 2/2005 | Sears ................... | B01D 1/0017 137/247 |
| 2004/0099521 | A1 * | 5/2004 | Demers ................ | B01D 1/0035 203/1 |
| 2005/0183832 | A1 * | 8/2005 | Owens ..................... | B01D 1/06 159/49 |
| 2005/0274598 | A1 * | 12/2005 | Forsyth .................... | A23C 1/12 203/91 |
| 2007/0235317 | A1 * | 10/2007 | Waldron .............. | B01D 5/0015 203/3 |
| 2007/0246193 | A1 * | 10/2007 | Bhatti .................. | F28D 15/0233 165/104.21 |
| 2008/0105529 | A1 * | 5/2008 | Burke .................. | B01D 1/0035 202/185.1 |
| 2009/0026061 | A1 * | 1/2009 | Gsell ...................... | B01D 1/289 202/175 |
| 2010/0200388 | A1 * | 8/2010 | Ward ...................... | B01D 1/28 202/180 |
| 2012/0267232 | A1 * | 10/2012 | Riley ..................... | B01D 1/225 203/11 |
| 2013/0118714 | A1 * | 5/2013 | Kaminski ............... | F28D 15/00 165/104.19 |
| 2013/0327711 | A1 * | 12/2013 | Hickenbottom ........ | C02F 1/447 210/636 |
| 2014/0034475 | A1 * | 2/2014 | Kamen .................. | B01D 5/006 203/7 |

FOREIGN PATENT DOCUMENTS

| | | | | |
|---|---|---|---|---|
| NZ | WO2004009203 | A1 * | 1/2004 | ............... B01D 1/28 |
| RU | 2450218 | | * 1/2012 | ............. F25B 1/053 |

OTHER PUBLICATIONS

Grundfos. (2010). The Centrifugal Pump. Machining.Grundfos.com (Year: 2010).*

* cited by examiner

METHODS AND FACILITIES FOR THERMAL DISTILLATION WITH MECHANICAL VAPOUR COMPRESSION

CROSS-REFERENCE TO RELATED APPLICATIONS

This application is a § 371 national stage entry of International Application No. PCT/EP2014/066278, filed Jul. 29, 2014, which claims priority to European Patent Application No. PCT/EP2013/065933 filed Jul. 29, 2013, the entire contents of which are incorporated herein by reference.

FIELD OF THE INVENTION

The present invention relates to distillation methods and facilities functioning in accordance with the principle of thermal distillation by mechanical vapour compression (MVC), particularly for the desalination or demineralization of water for the purpose of producing drinking water or producing demineralised water.

PRIOR ART

The invention relates to the use of several innovations relating to methods and facilities for distilling water by MVC, the purpose of which is to reduce the electrical energy consumption and the costs of manufacturing and operating the water demineralization or desalination units or plants (DWPs, "Desalination Water Plants") based on this method. All the innovations used optimally make it possible to reduce the CAPEX of the facilities, and in particular to reduce their specific electric energy consumption to values scarcely reaching around 2 to 4 kWh/m$^3$ of distillate produced.

The prior art with regard to DWPs using MVC limits the deployment of this method because of its very high electrical energy consumption (8 to 18 kWh/m$^3$ of distillate produced) compared with other desalination or demineralization methods such as thermal distillations supplied with steam mainly used in accordance with MSF (Multi-Stage Flash) or MED (Multi-Effect Distillation) methods, the auxiliary electrical energy consumption of which is situated between 2 and 8 kWh/m$^3$ of distillate, or the reverse osmosis method which, in the case of seawater, has a salinity equal to or greater than 30 g/l of the total consumptions (including the pretreatment and the auxiliary consumers) of 3 to 7 kWh/m$^3$ of permeate produced.

The MVC method is nevertheless very stable and procures a great deal of ease in use like, in general terms, all the thermal desalination or demineralization methods. The various' innovations aimed at in this invention make it possible to make it competitive on the market, especially vis-à-vis the reverse osmosis method which, like it, does not require a contribution of energy in steam form but which on the other hand uses techniques that are more complex, less stable and often tricky to operate.

GENERALITIES OF THE PRIOR ART

The description of DWPs using MVC according to the prior art can be summarized as follows, both for multiple-effect units (MED-MVC) and for single-effect ones. As indicated in FIG. 1, the unit is provided with an overall enclosure (01) generally in a partial vacuum in order to reduce the boiling point of the water to be evaporated and condensed. The simplest DWPs using MVC use a water bath, the surface of which provides the evaporation, and an exchanger immersed in the bath provides the condensation; modern units comprise an evaporator/condenser (EC) (11) of the tube or plate type, generally with the application of a thin falling film of feed water (TFF, "Thin Falling Film") maintained by means of spray nozzles (12) that distribute the water to be evaporated over the entire surface of the EC. The EC is constructed from a heat-conducting transfer material, one face/zone of which provides the evaporation (02) and other the condensation (05). In the case of units with a plurality of effects, the vapour created on the evaporation face of the EC of one effect is channeled to the condensation face of the EC of the following effect, till the last effect where the vapour is then conveyed and recompressed before being recirculated to the head of the first effect. The unit is provided with a system for conveying (03) and compressing (04) vapour, and auxiliary equipment including a feed-water supply system, a system for producing a partial vacuum and for eliminating non-condensable gases (NCGs) [NGC_VAC], a system for extracting distillate [Distillate] and a system for extracting the concentrate [Brine]. Recent developments use systems for recovering heat from the outgoing flows [Distillate]+[Concentrate] in favour of the incoming flow [feed water] in order to improve the overall thermal performances and to offer electrical energy consumptions achieving 8 to 12 kWh/m$^3$ of distillate.

CURRENT EMBODIMENTS

The world leaders in desalination by MVC are SIDEM, DOOSAN and IDE-Technologies. They all operate according to the same method. The DWPs using MVC encountered function in a pronounced vacuum, around 0.10 to 0.20 bar(a) (throughout the document, reference is made to absolute pressures), in order to reduce the evaporation temperature to values of around 40° to 50° C. Reducing the evaporation temperature offers two advantages: firstly a reduction in the heat losses of the whole of the plant, and secondly profiting from the almost total absence of the formation of calcium carbonate precipitates below the threshold temperature of 60° to 65° C. The vapour-transport systems (03) are internal or external to the overall enclosure and are sized for vapour velocities of around 100 m/s. The compressors are generally one in number per unit, generally of the centrifugal type, and operate, in the case of units of medium to large size (typically up to approximately 5000 m$^3$/day) at speeds common to industrial electric motors, namely 1500/1800 rev/min or 3000/3600 rev/min (the nominal speeds of standardised motors with respectively 4 poles or 2 poles, at 50/60 Hz).

The typical diagram of current desalination facilities according to the MVC method as implemented in industrial and public projects up to the present time is set out in FIG. 1 and comprises:

- a hermetic chamber (01) and a partial vacuum provided with a feed-water inlet means [FEED WATER], a distillate-discharge means [DISTILLATE], a concentrated-water discharge means [BRINE], and means for putting under negative pressure and extracting the non-condensable gases [NCG_VAC],
- in the hermetic chamber, an evaporator/condenser (11) offering evaporation zones/surfaces (02) and condensation zones/surfaces (05),
- a system for transporting (03) and compressing (04) vapour, providing the evaporation energy transfer cycle and condensation in the evaporator/condenser.

These current facilities are characterised by the fact that the various feed-water inlet and distillate and concentrate discharge means, and means for putting under negative pressure and extracting the non-condensable gases are external to the hermetic chamber, namely the external part of their pump body and their motor are subject to atmospheric pressure. The same applies to the compressor, the motor [MOT] of which is situated outside the hermetic chamber.

Problems Related to Current Implementations

The main problem related to current DWPs using MVC is the high electrical energy consumption. The latter has for a long time been attributed to a low efficiency of the vapour compressors.

A thorough analysis of current equipment also reveals the importance of the pressure drops in the steam transport tubes. The pressure drops in fact increase the temperature of the vapour without increasing the pressure and therefore constitute a phenomenon of vapour superheating which runs counter to the downstream condensation process. The pressure drops therefore constitute a double detriment in terms of compression energy: one with regard to the pressure drop for which it is necessary to compensate in terms of pressure, the other with regard to the superheating phenomena, which makes an increased pressure necessary in order to allow condensation.

Finally, the complexity of implementation of all the auxiliary equipment installed externally to the main chamber (01) having to operate under partial vacuum and having to be provided with effective thermal insulation often makes execution imperfect and subject to various vacuum leaks and losses of heat.

RECENT DEVELOPMENTS

Whereas current implementations have not changed in industrial or public markets, certain laboratory developments are changing along the following lines:
a tendency to reduce the lengths of the steam-transport circuits is observed,
some are making the profile of the compressors more complex in order to increase the efficiency thereof.
others depart from the known context and suggest carrying out the distillation at higher pressures than atmospheric pressure (and therefore at temperatures higher than 100° C.) in order to make the vapour more consistent and thereby increase the efficacy of the compression. Even if the compression efficiency is increased, this last way seems to be unsuited to the desalination of seawater since firstly it give rise to the necessity to use complex pretreatment in order to manage the phenomenon of precipitation and the deposition of scale, and secondly it runs counter to the reduction in heat losses that are related to the differential temperature between the process and its environment.

SUMMARY OF THE INVENTION

The objective of the invention is in particular to remedy these drawbacks of the prior art. More precisely, the invention relates mainly to the substantial improvement in efficiency of the compressor and almost total elimination of the pressure drops in the vapour-transport system. In this context, the facilities envisaged by the present invention are subject to pressure drops of less than 500 Pa, and preferably less than 100 Pa.

To this end, a first subject matter of the invention provides a thermal distillation facility with mechanical vapour compression, comprising:
a hermetic chamber (01) comprising an inlet for receiving feed water, an outlet for discharging the distillate, an outlet for discharging the concentrate and an outlet for discharging the non-condensable gases;
an evaporator/condenser (11) comprising an evaporation zone (02) and a condensation zone (05) inside said hermetic chamber (01);
a compressor (04) connected to a motor the compressor being able to increase the pressure of the vapour produced in the evaporation zone (02) and to convey it to the condensation zone (05);
the hermetic chamber (01) is under partial vacuum, the pressure inside said chamber being less than atmospheric pressure;
said installation being such that the compressor (04) and its motor [MOT] are situated inside said hermetic chamber (01), said motor comprising a stator and a rotor, said stator and said rotor being situated entirely inside the hermetic chamber (01).

According to an advantageous embodiment of the invention, the compressor (04) is a compressor able to achieve a rotation speed greater than 7500 rev/min or 15,000 rev/min, preferably able to achieve a rotation speed above 25,000 rev/min.

According to another advantageous embodiment, the compressor (04) is of the axial-flow type and the motor of the compressor is located in the flow of vapour, flowing from the evaporation zones (02) to the condensation zones (05).

According to another preferred embodiment, the compressor (04) comprises blades that are able to reach a peripheral speed above 100 m/s, more preferably above 150 m/s, even more preferably above 200 m/s.

According to another preferred embodiment, the pressure inside the hermetic chamber (01) is less than 0.75 bar(a), and is preferably less than 0.25 bar(a).

According to another advantageous embodiment, said facility of the invention comprises an axial-flow compressor and a tube (13), preferably a tube of the Venturi type, said tube (13) comprising a first part and a second part, the area of the cross section of the second part being greater than the area of the cross section of the first part, the compressor (04) being placed inside said first part and said second part being connected to the condensation zones (05) of the evaporator/condenser (11) or said second part comprising the header (29) or being connected to the header (29) of the evaporator/condenser (11) for admission of the vapour in the condensation zone. Preferably, said tube (13) comprises a heat-conductive material. More preferably, the heat-conductive material of said tube (13) is the same material as that used for manufacturing the evaporator/condenser.

According to another preferred embodiment, said facility of the invention comprises at least one integrated distillation module (14), said integrated distillation module (14) comprising an evaporator/condenser, a compressor (04) and a tube, preferably a tube of the Venturi type (13), said tube (13) comprising a first part and a second part, the area of the cross section of the second part being greater than the area of the cross section of the first part, the compressor (04) being placed inside said first part and said second part being connected to the condensation zone (05) of the evaporator/condenser (11) or said second part comprising the header

(29) or being connected to the header (29) of the evaporator/condenser (11) for admission of the vapour in the condensation zone.

According to another preferred embodiment, said facility of the invention comprises a feed-water supply pump (15), a distillate-extraction pump (16), a concentrate-extraction pump (17), a vacuum pump (19) for extracting non-condensable gases, at least one of said pumps and its motor being situated completely inside the hermetic chamber.

Preferably, said facility of the invention comprises a concentrate-recirculation pump (18) for conveying the concentrate into the evaporation zone of the evaporator/condenser. Advantageously, said concentration-recirculation pump and its motor are situated completely inside the hermetic chamber (01).

Advantageously, all said distillate-extraction and concentrate-extraction pumps and recirculation pump (16, 17, 18) and their motors are situated completely inside the hermetic chamber (01).

Preferably, said facility of the invention comprises
- regulation members (23, 27) for controlling the feed-water supply, distillate-extraction and concentrate-extraction rates; and/or
- heat exchangers between the incoming flow of feed water and the outgoing flows of the distillate, concentrate and non-condensable gases.

According to another preferred embodiment, the evaporator/condenser of said facility of the invention comprises a header (29) for admitting vapour into the condensation zone, said header (29) having a total cross section (29) and an admission cross section composed of the sum of the inlet cross sections of the condensation zones (05), the ratio between the admission cross section in the condensation zones (05) and the total cross section (29) of the header being greater than 70% or 80%, preferably this ratio is greater than 90% or 95%.

According to another advantageous embodiment of the invention, the compressor (04), the header (29) and/or optionally the tube (preferably a Venturi tube) (13) and the evaporator/condenser (11) are aligned, the header (29) and the tube being able to convey the vapour inside the condensation zone (05) of the evaporator/condenser on a rectilinear axis.

According to another preferred embodiment, the area of the cross section of the condensation zone (05) of said distillation facility of the invention decreases in the direction of flow of the vapour.

According to another preferred embodiment, said facility of the invention comprises a heat-makeup system for maintaining the temperature inside the hermetic chamber at a constant temperature. Preferably, said heat-makeup system comprises an electrical element or a heat pump.

According to a last particularly preferred embodiment, the invention provides an integrated distillation module (14) for a thermal distillation facility, characterised in that it comprises an evaporator/condenser, a compressor (04) connected to a motor and a tube (13), said tube (13) comprising a first part and a second part, the area of the cross section of the second part being greater than the area of the cross section of the first part, the compressor (04) being placed inside said first part and said second part being connected to the condensation zone (05) of the evaporator/condenser.

A second subject matter of the invention provides a facility for thermal distillation by mechanical vapour compression, comprising (i) a hermetic chamber (01) comprising an inlet for receiving feed water, an outlet for discharging the distillate, an outlet for discharging the concentrate and an outlet for discharging the non-condensable gases; (ii) an evaporator/condenser (11) comprising an evaporation zone (02) and a condensation zone (05) inside said hermetic chamber (01) and (iii) a compressor (04) connected to a motor; the area of the cross section of said condensation zone (05) decreasing, and preferably decreasing continuously and linearly, in the direction of the flow of the vapour. Preferably, the hermetic chamber (01) is under partial vacuum, the pressure inside said chamber being less than atmospheric pressure.

The reduction in the pressure drops in the vapour-transport system can also be achieved by an unusually large sizing of the vapour pipes (06) and/or the hydraulic configuration (for example the compressor).

A last subject matter of the invention provides a facility for thermal distillation by mechanical vapour compression, comprising (i) a hermetic chamber (01) comprising an inlet for receiving feed water, an outlet for discharging the distillate, an outlet for discharging the concentrate and an outlet for discharging the non-condensable gases; (ii) an evaporator/condenser (11) comprising an evaporation zone (02) and a condensation zone (05) inside said hermetic chamber (01); (iii) a compressor (04) connected to a motor, the compressor being able to increase the pressure of the vapour produced in the evaporation zone (02) and to convey it to the condensation zone (05); said compressor (04) being of the axial-flow type with deflectors or baffles, preferably having a diameter or dimensions greater than 50 cm, preferably greater than 100 cm or even greater than 200 cm. Preferably, said motor is situated inside or outside said hermetic chamber. Preferably, the hermetic chamber (01) is under partial vacuum, the pressure inside said chamber being less than atmospheric pressure.

BRIEF DESCRIPTION OF THE FIGURES

These aspects as well as other aspects of the invention will be clarified in the detailed description of particular embodiments of the invention, reference being made to the drawing of the figures, in which.

LIST OF REFERENCES PRESENT IN THE FIGURES (1) a hermetic chamber; (2) an evaporation zone (of the evaporator/condenser; (3) a vapour transport system or a vapour pipe; (4) a compressor (connected to a motor [MOT]; (5) a condensation zone (of the evaporator/condenser); (6) a large-size pipe; (7) the condensation zones inlet; (8) a chamber supplying the evaporator/condenser; (9) a compressor chamber; (11) an evaporator/condenser; (12) a spray nozzle; (13) a Venturi tube or a compressor chamber in the form of a Venturi tube; (14) an integrated distillation module; (15) a pump supplying feed water; (16) a pump extracting distillate; (17) a pump extracting concentrate; (18) a pump recirculating concentrate; (19) a vacuum pump extracting non-condensable gases; (20) (21) (22) pumps supplying feed water and extracting concentrate and distillate without their motors; (23) a drive means and motor common to the three supply and extraction pumps determining a fixed ratio between said pumps; (24) (25) (26) pumps supplying feed water and extracting concentrate and distillate; (27) a regulation member (for example for controlling the rate of the incoming or outgoing flows); (28) the cross section of the condensation zone inlet of the evaporator/condenser; (29) a header for admitting vapour into the condensation zone; (30) a profiled header for admitting vapour into the condensation zone making it possible to design the evaporator/condenser by means of simple cylindrical tubes.

The figures are not drawn to scale. Generally, similar elements are denoted by similar references in the figures.

DESCRIPTION OF THE INVENTION

The present invention relates to the methods and facilities functioning according to the thermal distillation principle using mechanical vapour compression. The invention relates mainly to the substantial improvement to the efficiency of the compressor and to the almost total elimination of pressure drops in the vapour transport system.

Figure 1:
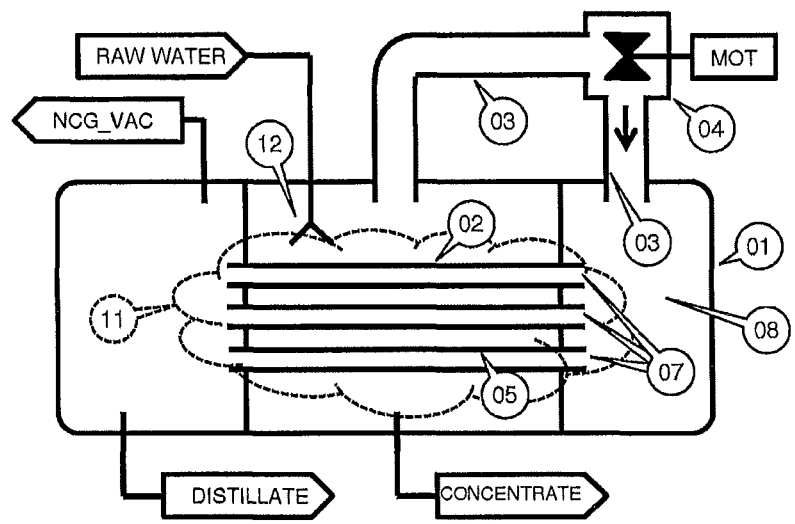
FIG. 1 depicts the typical diagram of desalination facilities of the prior art in accordance with the MVC method.
Figure 2:
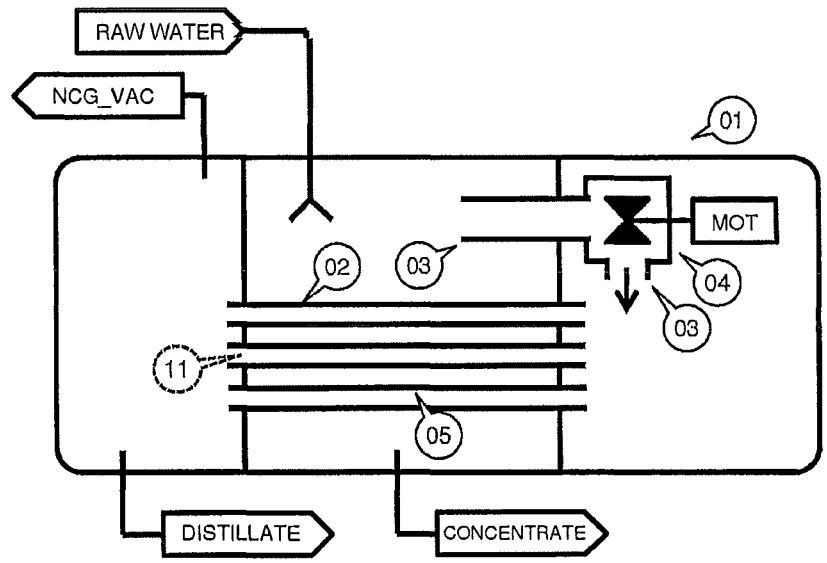
FIG. 2 depicts an embodiment of a distillation facility according to the present invention in which the entire motor [MOT] of the compressor (04) is situated inside the global enclosure under partial vacuum.
Figure 3:
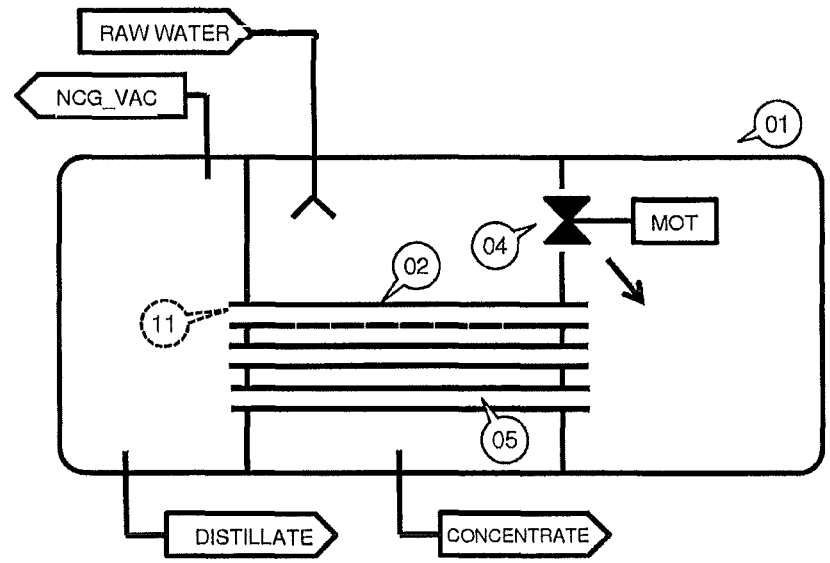
FIG. 3 depicts an embodiment of a distillation facility according to the present invention in which the entire motor [MOT] of the compressor (04) is immersed inside the hermetic chamber (01), at the same time omitting any vapour-transport pipe. The compressor can be integrated in the structure supporting the evaporator/condenser.
Figure 4:
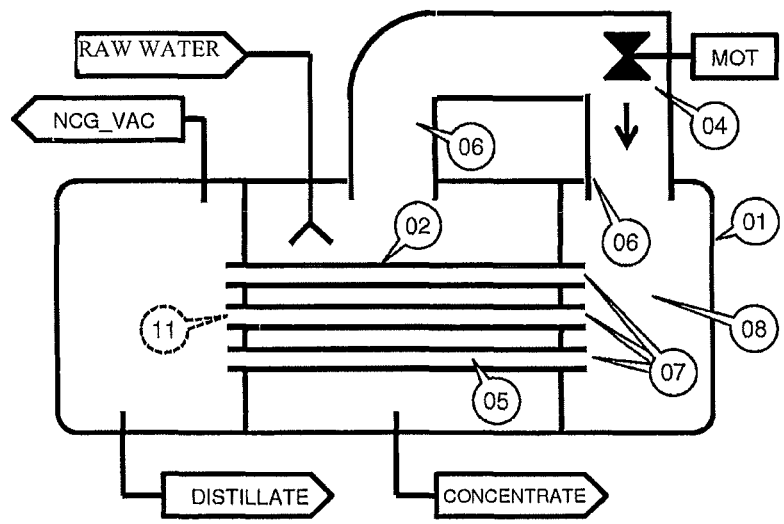
FIG. 4 depicts the typical diagram of oversized desalination facilities using the MVC method comprising large vapour pipes (06).
Figure 5:
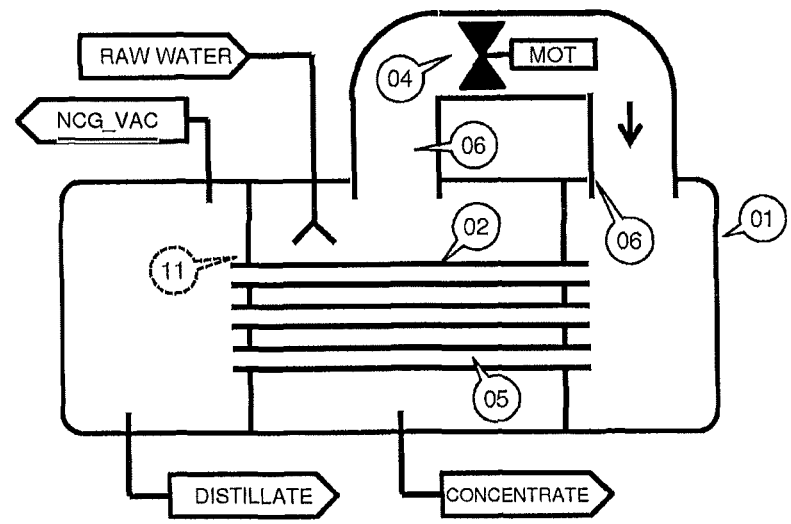
FIG. 5 depicts an embodiment of an oversized distillation facility in which the entire motor [MOT] of the compressor (04) is installed in the enclosure under partial vacuum (inside the hermetic chamber (01)) and in which the pipes and the compressor have an unusually large sizing.
Figure 6:
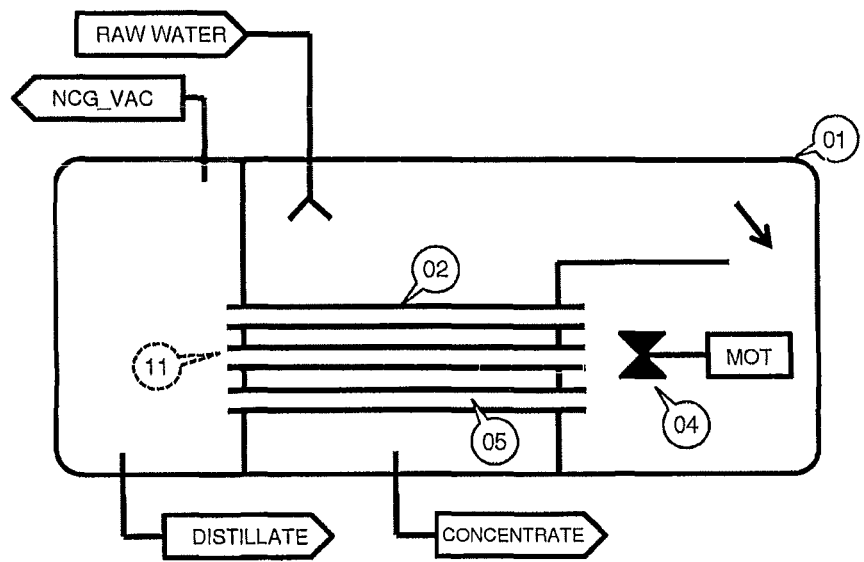
FIG. 6 depicts an embodiment of a distillation facility according to the present invention in which the entire motor [MOT] of the compressor (04) is immersed inside the hermetic chamber (01), installing the compressor (04) and its motor [MOT] so as to be contiguous with, the evaporator/condenser (11) at the entry to the condensation zones (05).
Figure 7:
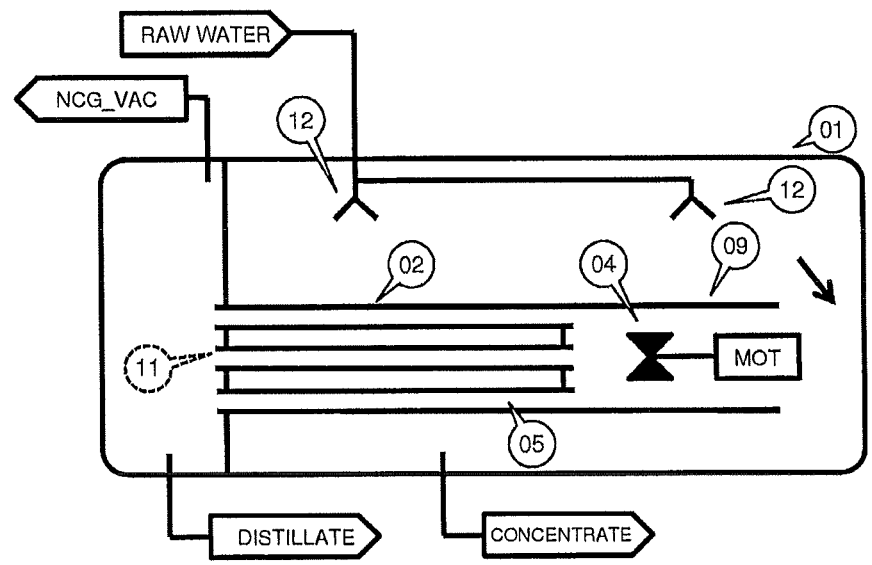
FIG. 7 depicts an embodiment of a distillation facility according to the present invention in which the entire motor [MOT] of the compressor (04) is immersed inside the hermetic chamber (01), installing the compressor (04) and its motor [MOT] in a compressor chamber (09) contiguously with the evaporator/condenser (11) at the entry to the condensation zones (05).

In at least one of its embodiments (e.g. FIG. 7), the invention is implemented using a compressor (04) turning at sufficiently high rotation speeds to be compatible with the very low density and great elasticity of the vapour held at (for example) less than 0.1 to 0.5 bar(a) and to thereby maintain an advantageous compression efficiency.

This implementation is made possible, on units of all sizes, by virtue of the inventive idea of the user to immerse the entire motor [MOT] (such as for example illustrated in [FIG. 7]) of the compressor inside the hermetic chamber, or even directly in the vapour stream. Preferably, said motor is an electric motor compatible with an atmosphere at 100% relative humidity, for example an electric motor commercially available in a tropicalized version and/or provided with an orifice enabling any condensation to emerge from the stator, and/or the electrical connections of which are implemented by welding sealed by means of a heat-shrinking resin sheath or by extending the stator conductors as far as an offset housing, and/or the windings of which are replaced by watertight bearings. The compressor and its motor, especially in the case of a compressor and its motor of reduced size, may in this way turn at rotation speeds of around several thousand or tens or even hundreds of thousands of revolutions/minute (rev/min) by virtue of the absence of a vacuum-sealing packing on the motor/compressor shaft.

This implementation is all the more advantageous as the size of the electric motors decreases, for equal power, with their nominal rotation speed, and this substantially when high speeds are reached. The problem of the space requirement for the motor in a high-efficiency turbine configuration of the axial flow type with deflectors (vane axial fan) therefore becomes much less constraining.

It is, by virtue of this invention, now possible to position a compressor at any ideal point on the vapour path or on the vapour flow from the evaporation zones to the condensation zones while reducing the complexity and length of this circuit to the maximum possible extent.

It is also now possible to use reasonably small turbines (i.e. preferably with dimensions less than 30 cm or 50 cm), turning at very high speed, provided with fine blades, easy to balance and inexpensive to produce by moulding/injection methods.

It is important to note that one of the fields of the invention relates to the production of drinking water plants by the desalination of seawater, mainly large major plants with a daily production capacity of 10 to 1000 mld (millions of litres per day), or even more.

In this field, the investments are high and are necessarily based on the good credentials of the existing plants. In this way, it is usual for the plants according to the novel methods to first of all be constructed to small sizes, and then increase in size along with good credentials and over the years. It is in practice impossible to finance a large plant or a major MVC desalination plant without small plants or units having demonstrated their capacity to produce and their good credentials, which gradually takes years.

One of the subjects of the invention consists of introducing, in a general manner in this context, the compressor of the axial flow type (with deflectors, vane axial fan or blower or compressor) in the field of desalination by MVC, which necessarily involves the use of small units involving small turbines rotating at high speed. This procedure is made possible by virtue of the inventive idea of introducing the compressor motor (MOT) inside the hermetic chamber (01). The general principle of a first subject matter of the invention is based on the positioning of the compressor (04) and its motor [MOT] in a facility for thermal distillation by MVC. Therefore a first subject matter of the invention provides a facility for thermal distillation by MVC comprising a hermetic chamber (01) under partial vacuum, an evaporator/compressor (11) comprising an evaporation zone (02) and a condensation zone (05) inside said hermetic chamber (01), and a compressor connected to a motor, the compressor being able to increase the pressure of the vapour produced in the evaporation zone and to convey it to the condensation zone, in which said compressor (04) and its motor are situated inside the hermetic chamber (01), said motor comprising a stator and a rotor, said stator and said rotor being situated entirely inside the hermetic chamber.

This arrangement, depicted schematically in for example FIGS. 2, 3, 6, 7, 10 and 11, procures several advantages:
- it makes it possible to achieve a mounting of the motor in direct coupling with the compressor turbine;
- it makes it possible no longer to require the use of a packing or seal previously necessary for vacuum sealing of the facility,
- it makes it possible to be able to judiciously place the single-piece compressor/motor more or less anywhere on the path of the vapour between the evaporation zones and the condensation zones; this makes it possible to considerably simplify the vapour transport circuit and to reduce the pressure drops to an almost zero value (for example, in FIGS. 6, 7, 10, 11),
- it makes it possible to effect a direct recovery of the thermal energy dissipated by the electric motor of the compressor in the hermetic chamber, for example by means of a simple cooling circuit on the water recirculation or on the feed water supply taking place without any differential pressure constraint (here the differential pressure existing between the inside of the hermetic chamber (01) and the atmospheric pressure outside the unit,
- it simplifies the external enclosure of the hermetic chamber and makes it easier to thermally insulate it.

This arrangement is made feasible on a technical level by simply using an insulating varnish on all the coils of the rotor and stator. It is also possible to cast the windings in worked blocks of resin, providing the required protection in this saturated vapour atmosphere.

According to a preferential embodiment, the compressor is a compressor with a rotation speed greater than 7500 rev/min, preferably greater than 12,000 rev/min or even greater than 15,000 rev/min, 20,000 rev/min or 25,000 rev/min. This feature is made possible by virtue of the previous feature, since a seal on the motor/compressor shaft is no longer needed.

Preferably, the compressor and its motor are a small compressor and motor. The term "small compressor/motor" means a compressor having a diameter or dimensions of less than 50 cm, 30 cm or even less than 20 cm or 15 cm, the motor having a diameter less than the compressor turbine, namely respectively less than 40 cm, 20 cm, 15 cm or 10 cm. Said small compressor is able to achieve or operate at rotation speeds above 10,000 rev/min, 15,000 rev/min or even 25,000 rev/min, or, expressed alternatively, is able to achieve or operate at rotation speeds of between 10,000 rev/min and 200,000 rev/min, preferably between 25,000 rev/min and 200,000 rev/min. These high rotation speeds of this small compressor make it possible to obtain high peripheral speeds above 50 m/s, preferably above 75 m/s, more preferably above 100 m/s, such as for example 150 m/s or 200 m/s. The peripheral speed is defined as the linear speed of the ends of the blades, that is to say the rotation speed multiplied by the length of the radius of the compressor or of the blades of the compressor. In addition, this high peripheral speed makes it possible to obtain a high compression efficiency (i.e. an efficiency of >75%, or even >80%, or >85%) under the partial vacuum conditions (in which the vapour has a very low density and high elasticity).

Equally, the advantageously small size of the very high speed motors (by way of example up to 0.04 m of diameter with a motor of 4 kW), the diameter of which may be similar to that of the compressor hub (for example an axial turbine), makes it possible not to cause any additional obstruction to the passage of the vapour, or only a little. In addition, in the case of a compressor and its small motor makes it possible to reduce manufacturing costs.

A person skilled in the art knows how to calculate the rotation speeds in order to generate the necessary vapour flow rate (variable according to the temperature of the bath of the facility).

This arrangement makes it possible to maintain performances of the high-efficiency compressors in a vapour environment with a very low pressure. This is because vapour with a low pressure at 0.1 to 0.5 bar(a), preferably 0.1 to 0.2 bar(a), has a density proportionally less than that of air and increased elasticity. If it is wished to use a high-efficiency compressor such as an axial flow compressor with deflectors and to obtain an efficiency of around 85% (on the simple fluid compression part), this state with a very low density and high elasticity of the fluid to be compressed makes it necessary, among other things, for the rate of repetition of the beatings of the blades of the compressor in a defined space to be increased. This increase in repetition of the beatings of the blades is obtained by using both an increased number of blades and increased rotation speed.

In the absence of this high rotation speed capability, particularly valid in the case of small compressors and motors, only centrifugal-effect compressors remain usable, considering high peripheral speeds of more than 50 m/s (and therefore large centrifugal compressors, having a diameter greater than 50 cm or 1 m), since by construction the vapour stream entering the compressor has no other option than to emerge from the turbine blades under the effect of centrifugal force; nevertheless, not only do these compressors have lower efficiency (on the simple fluid compression part) but in addition they do not integrate well in the path of the vapour if it is desired, as is the case in the field of distillation by MVC, to reduce to the maximum possible extent the hydraulic pressure drops relating to the transport of the vapour.

The method can function with a slight drop in performance by means of other types of turbine, provided that they are operated at a high rotation speed. A simple radial-flow rotary turbine, for example, makes it possible to achieve efficiencies of up to approximately 75% (on the simple compression part). Other types of turbine such as centrifugal wheels with profiled or inclined blades (backward curved or backward inclined fan or blower or compressor) have advantageous performances but are less suited to the in-line configuration of the preferred embodiment of the invention.

According to a preferred embodiment of the invention, the compressor is of the axial flow type with deflectors or baffles, and the compressor motor is located directly in the vapour stream, said vapour stream flowing from the evaporation zones (02) to the condensation zones (05). Since the size and diameter of the electric motors decrease at equal nominal power depending on the nominal rotation speed, the advantage to be considered of high-speed motors makes it possible to house the motor in the cylindrical space adjacent to the turbine, and with a diameter equivalent to or less than its hub. This makes it possible easily to design, for small turbines, a profiled central deflection casing integrating the motor, which does not interfere with the vapour stream passing through the turbine and its upstream and downstream parts.

Preferably, the pressure inside the hermetic chamber (01) is less than 0.75 bar(a), preferably less than 0.5 bar(a) or even less than 0.25 bar(a). Distillation of mineralized water, in particular of seawater, can in principle take place at all pressures, provided that the temperature of the method corresponds to the boiling point of the fluid at the given pressure. With the exception of the ebullioscopic variance generated by the salinity of seawater, the relationship between the boiling point and the pressure is governed by the Mollier diagram.

Nevertheless, depending on the temperature ranges chosen, various constraints arise; a major constraint in the context of the desalination of seawater is the management of the precipitates and the furring of the internal equipment, especially of the exchanger. Given the critical threshold temperature of 60° to 65° C. below which the formation of the precipitates, mainly the carbonates, is very much reduced, the methods and facilities according to the various embodiments of the present invention preferably function as temperatures and pressures respectively below 70° C. and 0.31 bar(a), more preferably below 60° C. and 0.2 bar(a). Moreover, it is at these low pressure ranges that the type of compressor invented will exhibit its best performances.

Figure 8:
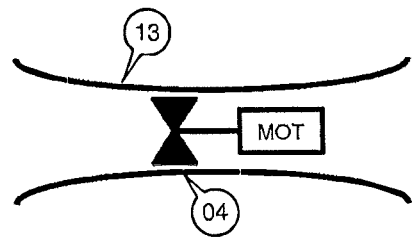
FIG. 8 shows a compressor chamber in the form of a Venturi tube.

According to a preferred embodiment of the invention, the compressor, preferably an axial flow compressor, is housed in a tube, preferably a Venturi tube (13) (FIG. 8), said tube comprising a first part and a second part, the area of the cross-section of the second part being greater than the area of the cross-section of the first part, the compressor (04) being placed inside said first part and said second part being connected to the condensation zones of the evaporator/condenser or to the header or said second part itself forming a part of the header. Preferably the diameter of said tube changes (increases) gradually with the path of the vapour, in accordance with a geometry similar to a Venturi tube allowing a laminar flow of the vapour, until it reaches a diameter that is hydraulically compatible with the header (29) or with the entry section of the condensation zones of the evaporator/condenser. In the case of the axial flow compressor, the Venturi tube, having a smaller diameter in a part of said tube (e.g. at its middle), procures several advantages:

the fluid to be compressed undergoes an increase in speed that is necessary to the supply of the turbine, in order to increase the efficiency thereof, by virtue of the increase in speed of the fluid at the turbine, there is a reduction in pressure in accordance with Bernouilli's theorem (the Venturi effect) that participates in the reduction or even elimination of the formation of precipitates on the blades of the turbine, precipitates caused by the condensation generated on the blades at the high-pressure points (it should be noted that the vapour is saturated at the entrance to the tube). The use of such a tube (of the Bernouilli/Venturi type) accelerates the fluid while decreasing its pressure, without any loss of energy between the entrance to the tube and its exit, to within any pressure drops. Said pressure drops may be very small through effecting a design particular to each configuration of flow rates and pressures, and by using deflectors at the entrance that prevent the formation of vortices.

According to another preferred embodiment, the compressor chamber (09), in particular in the form of a tube, preferably in the form of a Venturi tube (13), is composed of a heat-conductive material, which is preferably the same material as that used for manufacturing the evaporator/condenser. This option contributes to the cooling of the part of the tube directly in the vicinity of the turbine, which undergoes an increase in temperature related to the high turbulences present at this point. This option therefore makes it possible to contribute, however slightly, to a compression step that exhibits the least increase in temperature possible, knowing that any increase in temperature results in an overheating of the vapour that inhibits the required condensation phenomenon.

Figure 9:
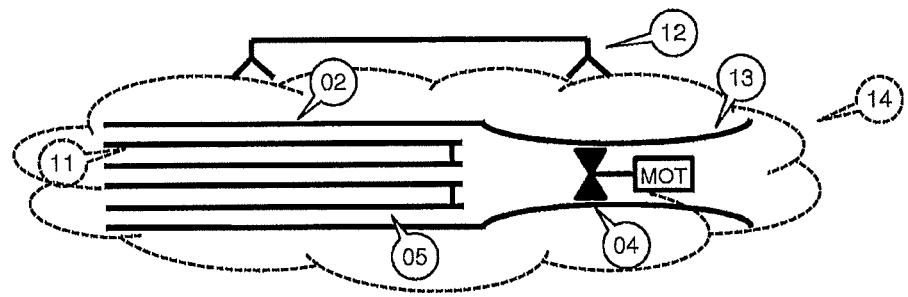
FIG. 9 depicts an integrated distillation module, comprising an evaporator/condenser (11) and a compressor (4) and its motor; the compressor being situated in a compressor chamber in the form of a Venturi tube (13).
Figure 10:
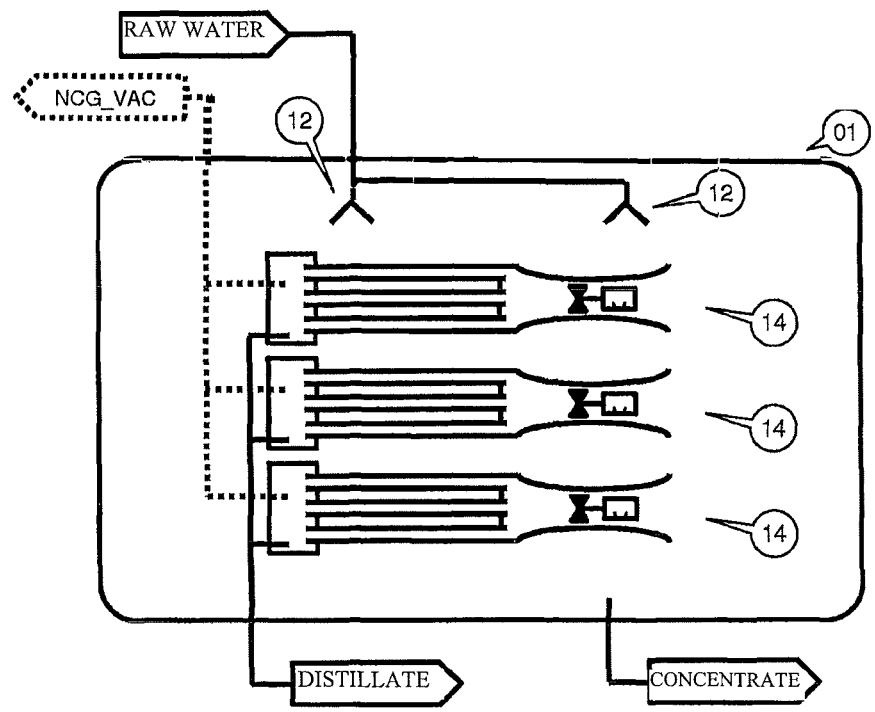
FIG. 10 depicts an embodiment of a distillation facility according to the present invention comprising multiple integrated distillation modules.

In accordance with another embodiment, the present invention provides a facility for thermal distillation with mechanical vapour compression comprising at least one integrated distillation module (IDM) [FIG. 9], said integrated distillation module (14) comprising an evaporator/condenser (11), a compressor (04) and a compressor chamber (09), preferably in the form of a Bernouilli/Venturi tube (as described above) (13). This embodiment of the invention may be implemented by installing either just one or a plurality of IDMs in the hermetic enclosure [FIG. 10]. By installing a plurality of IDMs in the same hermetic enclosure, all the auxiliary services [feed water, NCG_VAC, distillate, concentrate] can be common and the result is, according to circumstances, an economy of scale. This modular way of designing a DWP makes it possible to construct plants with very high capacity while using numerous small IDMs constructed in series (e.g. manufactured by moulding and injection) in a less expensive way. By way of example, the marginal manufacturing cost of 25 assemblies consisting of moulded/injected turbine and pressed tube each with a capacity of 1 m³/h in accordance with the method described in this document should not exceed a few hundredths of the cost price of the mechanical part of a current compressor included in an MVC unit with a capacity of 25 m³/h as would be sold today.

Figure 11:
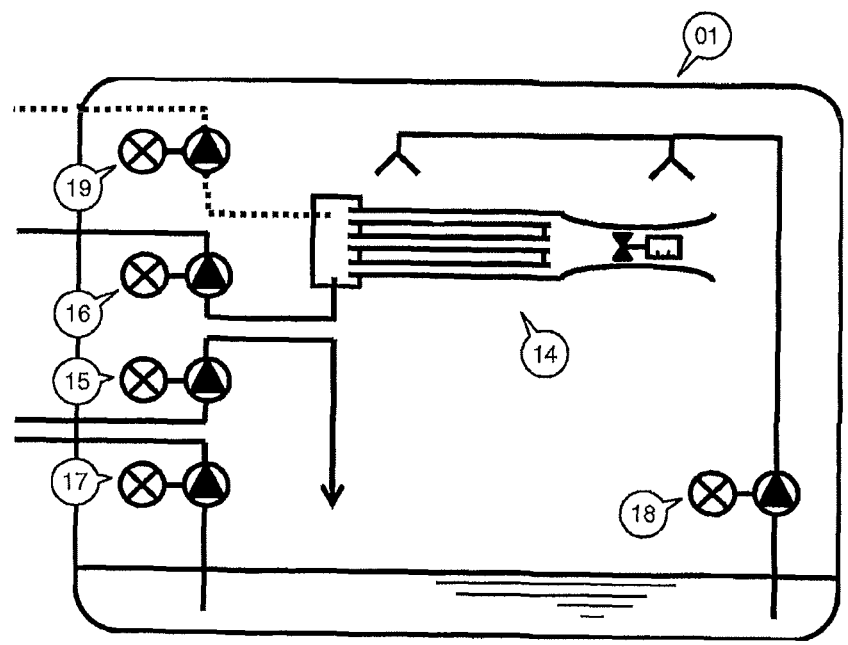
FIG. 11 depicts an embodiment of a distillation facility according to the present invention in which the auxiliary equipment is integrated inside the global enclosure under partial vacuum, namely the recirculation pump and its motor (18), the feed-water supply pump and its motor (15), the distillation-extraction pump and its motor (16), the concentrate-extraction pump and its motor (17), and the pump for extracting non-condensable gases and putting under vacuum and its motor (19).

According to another preferred embodiment [FIG. 11], said thermal distillation facility with mechanical vapour compression comprises a feed water supply pump (15), a distillate extraction pump (16), a concentrate extraction pump (17), and a vacuum pump for extracting non-condensable gases (19), in which at least one of said pumps and its motor is situated completely inside the hermetic enclosure. According to a preferred variant of this embodiment, the distillate extraction, concentrate extraction and recirculation pumps, as well as their motors, are situated completely inside the hermetic enclosure. This arrangement has several important advantages:
- it simplifies the construction of said pumps since, in the same way as disclosed above for the compressor, said pumps, once immersed in the hermetic chamber, no longer require sealing or a vacuum-resistant gasket on the motor/pump shaft;
- it simplifies the form and implementation of the heat insulation of the hermetic chamber since it is no longer necessary to continue the thermal insulation of the feed and extraction pipes beyond the pumps that are typically installed outside the main block of the hermetic enclosure;
- it makes it possible to effect a direct recovery of the thermal energy dissipated by the pumps and their motors in favour of maintaining the temperature of the water bath to be evaporated.

According to another preferred embodiment, said thermal distillation facility using mechanical vapour compression comprises a pump for recirculating the concentrate [FIG. 11] (18) for transporting/recirculating the concentrate in the evaporation zone of the evaporator/condenser. This arrangement, which is well known for increasing the conversion rate of distillation facilities, is made easy to implement in enclosures under partial vacuum by virtue of the idea of placing the whole of the recirculation pump (that is to say complete with its motor) inside the hermetic chamber. In the same way as for the compressor and the other pumps installed in the hermetic enclosure, this arrangement has the same advantages:
- it simplifies the construction of said pumps since, in the same way as disclosed above for the compressor, said pumps, once immersed in the hermetic chamber, no longer require sealing or a vacuum-resistant gasket on the motor/pump shaft; in addition the entire downstream part, under vacuum, of the extraction and recirculation pumps giving rise to various known cavitation problems is very much reduced;
- it simplifies the form and implementation of the heat insulation of the hermetic chamber since it is no longer necessary to continue the thermal insulation of the feed and extraction pipes beyond the pumps that are typically installed outside the main block of the hermetic enclosure;
- it makes it possible to effect a direction recovery of the thermal energy dissipated by the pumps and their motors in favour of maintaining the temperature of the water bath to be evaporated.

Recirculation of the concentrate makes it possible to disconnect the spray system (12) from the feed water supply system, with the advantages of allowing spraying at a different or higher rate than what is normally imposed by the rate of conversion of the effect, and being able to increase the conversion rate of the effect up to values of 50% or even higher.

Preferably, said thermal distillation facility with mechanical vapour compression comprises heat exchangers between the incoming feed water flow and the outgoing flows of distillate, concentrate and non-condensable gases, as well as regulation members (23, 27) for controlling the flow rates of supply of feed water, extraction of distillate and extraction of concentrate. Since the temperature of the method is defined, preferably below 70° C. or 60° C., more preferably between 40° and 60° C., it is necessary to ensure that the heat and energy contained in the hermetic enclosure is not continuously discharged outside and thus lost as the bath to be distilled is renewed with feed water and the distillate, concentrate and other non-condensed gases are extracted. Each heat loss must be compensated for by an additional supply of energy, either by a heating means, or an excess of functioning of the compressor. In order to avoid such heat losses, it is necessary to install a multiflow exchanger which, in one direction, heats the incoming feed water and, in the other, recovers the heat energy from the outgoing flows.

In order to ensure optimum functioning of this multiflow heat exchanger, it is essential that the quantities of heat exchanged per unit of time be equivalent, otherwise differences in temperature appear at the discharges of the exchanger vis-à-vis the temperature of the receiving medium. Since the temperatures of the method are constant and the external temperatures have low variability, it is necessary for the flow rates of the fluids exchanged to be stable. In this context, a very simple embodiment comprises the placing of the flow meters on each of the incoming and outgoing lines, and to slave the speeds of the respective feed and extraction pumps to a fixed flow rate value.

One of the three flow rate regulations will however have to be adaptable to the control of the level either of the water bath to be distilled or of the distillate reservoir depending on whether the compressor is operating at fixed or regulated speed, in order to compensate in the long term for differences in production that will result from the various inaccuracies of the flow rates and temperatures of the fluids concerned.

Figure 12:
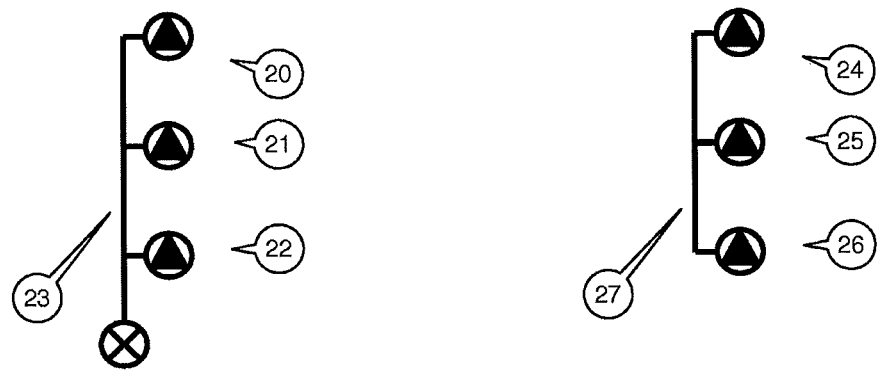
FIG. 12 depicts two means for regulating the incoming and outgoing flow rates according to fixed ratios. On the left, the three pumps supplying and extracting the distillate and concentrate (20, 21, 22) are of the volumetric type and coupled to a common mechanism driven by a single motor; in this way the incoming and outgoing flow rates are continuously in the same proportion whatever the speed of rotation of the common motor, said proportion defining the conversion rate of the distillation unit. On the right, said three distillate and concentrate supply and extraction pumps (24, 25, 26) are of any type and each slaved to a speed-variation member, said member being controlled so as to fix the incoming and outgoing flow rates according to the required conversion rate of the distillation unit.

Another embodiment of this feature is to consider a distillate extraction pump slaved to the level of distillate to be extracted, and then to slave the feed water supply and concentrate extraction pumps to the extraction rate of the distillate in accordance with a fixed ratio determining the conversion rate. In doing this the flow rates of the incoming and outgoing flows are continuously balanced and the heat exchangers between these flows are optimised. One embodiment of this feature indicated for small units is to consider the use of volumetric pumps coupled together in accordance with a fixed ratio [FIG. 12, on the left] determining the conversion rate of the unit, the assembly being slaved to the distillate extraction level. A preferential option is then to use the absolute pressure encountered on the input port of the feed water supply pump as mechanical energy in order to move all the three pumps (20, 21, 22) through the common drive mechanism (23). For larger units, one embodiment is to consider centrifugal pumps each provided with a flow meter and slaved to frequency variators in accordance with a regulation that imposes said fixed ratio determining the conversion rate of the unit.

According to another preferred embodiment, said evaporator/condenser of said thermal distillation facility using mechanical vapour compression comprises a header (29) for admitting vapour into the condensation zone, said header

(29) having a total cross-section (29) and an admission cross-section composed of the sum of the entry cross-sections of the condensation zones (5), the ratio between the total admission cross-section in the condensation zones (05) and the total cross-section (28) of the header (29) being greater than 70% or 80%, and according to a preferred embodiment greater than 90% or 95%, considerably reducing the pressure drops of the vapour entering the condensation zones. This is because, in an embodiment of the MVC method as described in this document, where one of the main objectives is to reduce the energy (electrical) consumption of the facility, including the great reduction in the pressure drops, it is indeed necessary to bear in mind that each hydraulic pressure drop generated on the vapour is converted into thermal energy, namely confers an increase in temperature on the fluid and/or on the obstacle that causes said hydraulic pressure drop. This increase in temperature, as already mentioned above, applied to the vapour at a given pressure, will transform the vapour into superheated vapour. Since superheated vapour does not condense well, this phenomenon, on an energy level, runs counter to the MVC method; it offers in fact a double penalty:

it requires more pressure in order to compensate for the pressure drops, which is regrettable in the light of the limited performances of vapour compressors, all the more so in the field of vapour at reduced pressure, it also requires an increase in the working or condensation pressure in order to initiate the condensation phenomenon.

Figure 13:
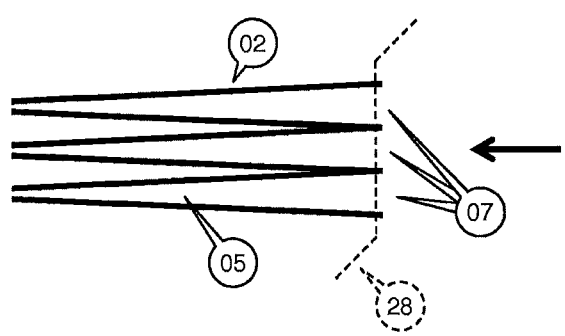
FIG. 13 depicts condensation zones of an evaporator/condenser such that the cross section of the condensation zones decreases with the path of the vapour.
Figure 14:
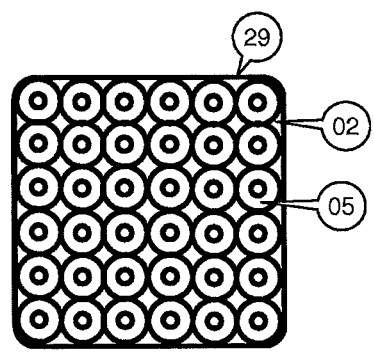
FIG. 14 shows an embodiment of the evaporator/condenser using conical tubes, the large-diameter ends of which are simply placed side by side, offering a ratio between the admission cross section in the condensation zones (05) and a total cross section (29) of the header greater than 70%.
Figure 15:
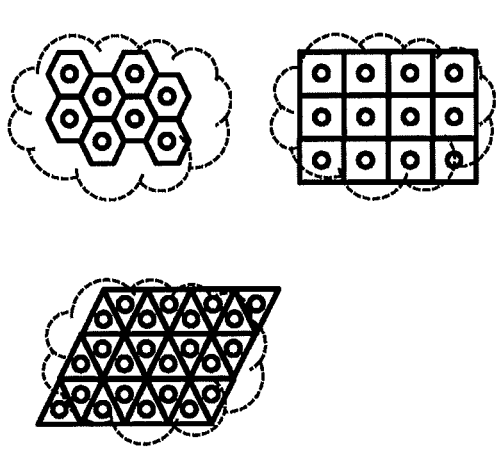
FIG. 15 shows alternative embodiments of the evaporator/condenser comprising tubes with a hexagonal, triangular or square initial cross section, offering ratios between the admission cross section in the condensation zones (05) and a total cross section (29) of the header greater than 95%.
Figure 16:
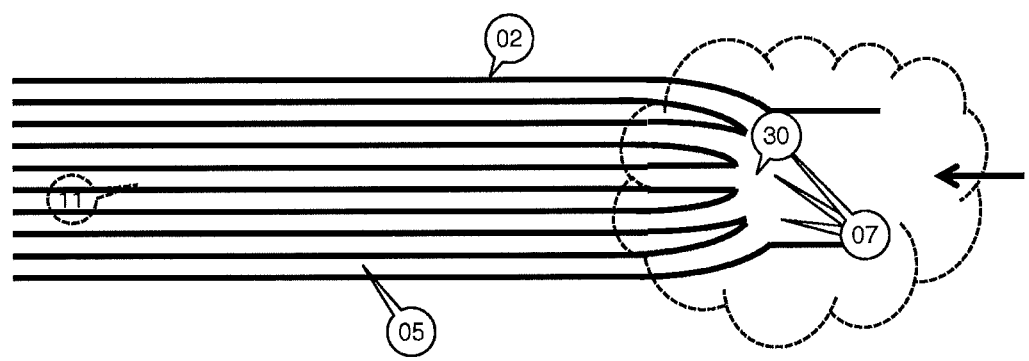
FIG. 16 shows an alternative embodiment of the header (30) of the evaporator/condenser and of the evaporator/condenser using a header provided with contiguous and angled/profiled outgoings generating very little very pressure drop, making it possible to supply an evaporator/condenser designed by means of simple cylindrical tubes.

For this reason, a main objective is to eliminate as far as possible the pressure drops over the entire path of the vapour. A preferential way of implementing this principle is to design an exchanger so that its opening to the vapour is maximum, or, expressed alternatively, so that the cross-section of admission of the vapour in the condensation zones is at least 70% or 80%, preferably at least 90% or 95% of the total cross-section of the header (29) (28). This can be manifested in various ways, including the following few preferred embodiments:

an assembly of round tubes (FIG. 14), preferably with a decreasing cross-section [FIG. 13], the parts of which accepting the vapour are contiguous in order to procure a large opening ratio (07) while working with tubes with a cylindrical cross-section;

an assembly of tubes that can be fitted together (hexagonal, square or triangular cross-section) (FIG. 15), preferably with a decreasing cross-section [FIG. 13], the parts of which accepting the vapour are contiguous in order to procure a maximum opening ratio (07); this embodiment is however more expensive because of the more complex form of the tube;

an assembly of conventional round tubes with a constant cross-section [FIG. 16] preceded by a profiled header (30) that distributes the exit cross-section of the tube (13) of the compressor in a certain number of profiled outgoings with contiguous and refined openings emerging on gentle curves generating few pressure drops;

an assembly of plates in a concertina having an almost total opening and a cross-section similar to FIG. 13.

According to another preferred embodiment, said compressor (04), said header (29) and, optionally, said compressor chamber (9) or said tube (13) and said evaporator/condenser of said thermal distillation facility using mechanical vapour compression are aligned, said header (29) and said compressor chamber or tube (13) being able to convey the vapour inside the condensation zone (05) of the evaporator/condenser along a rectilinear axis. This arrangement, such as the previous arrangement relating to the opening ratio of the exchanger, is important for the purpose of reducing the pressure drops that have a double detrimental effect (as already explained and evidenced above).

According to another preferred embodiment, said thermal distillation facility using mechanical vapour compression further comprises a heat make-up system for maintaining the temperature inside the hermetic chamber at a constant temperature, in accordance with a preferred embodiment by means of an electrical element or by means of a heat pump. It is necessary in fact to avoid the compensation for the heat losses through the thermal insulation of the enclosure and/or through the multiflow exchanger to take place by means of an increase in power of the compressor; the efficiency of the compressor is in fact less high than a simple heating element, and very much less than the efficiency of a heat pump, all the more so working with such a low temperature delta. Maintaining the temperature of the bath is important; an excessively low temperature will reduce the capacity for energy transfer through the material of the exchanger, while an excessively high temperature will generate an excess of vapour that will not be able to participate in the energy exchange through the exchanger and will be discharged through the putting under vacuum (or the extraction from the NCG_VAC). In both cases there is a loss of efficiency of the distiller, the worst case being an excessively low temperature.

Preferred embodiments are:

for small units, a simple electric element placed in the bath or in the concentrate recirculation circuit, or at the feed water inlets, in the case of a facility comprising a large number of IDMs, an auxiliary common circuit for heat-transfer fluid heated by a centralized heat pump; a heat pump system has a relative efficiency that may range up to 600% of that of the simple electric element, namely up to 750% of the vapour compression system.

FIG. 13 depicts both (an evaporator/condenser having) a plate-type exchanger section and an exchanger section with tubes with decreasing cross-section.

Concerning the decreasing cross-section of the condensation zones along the path of the vapour in the condensation zone, the advantage of this embodiment of the evaporator/condenser is three-fold:

it allows spraying by the spray nozzles (12) of the face/zone of the exchanger responsible for the evaporation (02), which would no longer be possible if the tubes were contiguous over their entire length;

it promotes contact of the vapour to be condensed in the advanced parts of the path of the vapour; this is because, as the vapour advances and condenses in an exchanger, the quantity of remaining vapour decreases and, if the cross-section of the tube or of the condensation volume remains constant, the vapour concentration decreases along with the advance in the exchanger, and in the same way the condensation efficiency decreases;

reducing the exchange surfaces and the quantity of material necessary for producing them by a factor of around 30% to 45% for equal efficiency.

By using exchangers with a cross-section decreasing with the path of the vapour, not only is there a 30% to 45% saving of construction material for the exchanger, but in addition its efficiency is increased for equal conditions. These advantages are independent of the characteristics and positioning of the compressor and are also valid in the distillation facilities of the prior art.

Therefore a second subject matter of the present invention provides a thermal distillation facility using mechanical vapour compression comprising a hermetic chamber (01) preferably under partial vacuum, comprising an inlet for receiving feed water, an outlet for discharging the distillate, an outlet for discharging the concentrate and an outlet for discharging the non-condensable gases; an evaporator/condenser (11) comprising an evaporation zone (02) and a condensation zone (05) inside said hermetic chamber (01) and a compressor (04) connected to a motor; said evaporator/condenser having a decreasing cross-section of the condensation zone along the path of the vapour in the condensation zone.

A last subject matter of the present invention provides a thermal distillation facility using mechanical vapour compression comprising a hermetic chamber (01) preferably under partial vacuum comprising an inlet for receiving feed water, an outlet for discharging the distillate, an outlet for discharging the concentrate and an outlet for discharging the non-condensable gases; an evaporator/condenser (11) comprising an evaporation zone (02) and a condensation zone (05) inside said hermetic chamber (01) and a compressor (04) connected to a motor; said compressor being a compressor of the axial-flow type. Preferably, said axial-flow compressor comprises deflectors or baffles. Preferably, said axial flow compressor has a diameter or dimensions greater than 30 cm or 50 cm, more preferably greater than 75 cm or 1 m. In this context, the motor of said compressor may be situated outside or inside the hermetic chamber.

The various embodiments of the methods and facility of the present invention are particularly useful in the field of the desalination of seawater or the demineralization of water, for example for producing drinking water or demineralised water.

The invention claimed is:

1. A thermal distillation facility for desalinating water, comprising:
   a hermetic chamber comprising an inlet for receiving a feed water, an outlet for discharging a distillate, an outlet for discharging a concentrate, and an outlet for discharging non-condensable gases;
   an evaporator/condenser comprising an evaporation zone where a vapour having a first pressure is produced and a condensation zone, wherein the evaporator/condenser is located inside said hermetic chamber;
   a compressor connected to a motor, wherein the compressor is configured to convey the vapour to the condensation zone; and
   a spray nozzle positioned to spray water on an exterior face of the evaporator/condenser, the evaporator/condenser being responsible for evaporating the feed water;
   wherein the hermetic chamber is under partial a vacuum, the partial vacuum producing a second pressure inside said hermetic chamber that is less than atmospheric pressure;
   wherein the compressor and the motor are situated inside said hermetic chamber, said motor comprising a stator and a rotor, said stator and said rotor being situated entirely inside the hermetic chamber;
   wherein the compressor is an axial flow type compressor and the motor of the compressor or an assembly consisting of the compressor and the motor is located in a vapour stream flowing from the evaporation zone to the condensation zone; and
   wherein the thermal distillation facility uses mechanical vapour compression to desalinate the water.

2. The thermal distillation facility according to claim 1, wherein the compressor is able to achieve a rotation speed above 7500 rev/min.

3. The thermal distillation facility according to claim 2, wherein the compressor is able to achieve a rotation speed above 25,000 rev/min.

4. The thermal distillation facility according to claim 1, wherein the second pressure inside the hermetic chamber is less than 0.75 bar(a).

5. The thermal distillation facility according to claim 4, wherein the second pressure inside the hermetic chamber is less than 0.25 bar(a).

6. The thermal distillation facility according to claim 1, wherein the compressor comprises blades that are able to achieve a peripheral speed above 50 m/s.

7. The thermal distillation facility according to claim 1, further comprising a tube, said tube comprising a first part comprising a first cross-sectional area and a second part comprising a second cross-sectional area,
   wherein the second cross-sectional area is greater than the first cross-sectional area,
   wherein the compressor is located entirely inside said first part, and
   wherein said second part is connected to the condensation zone of the evaporator/condenser.

8. The thermal distillation facility according to claim 7, wherein said tube comprises a heat-conductive material.

9. The thermal distillation facility according to claim 8, wherein the heat-conductive material is also used for manufacturing the evaporator/condenser.

10. The thermal distillation facility according to claim 9, further comprising at least one integrated distillation module, said integrated distillation module comprising the evaporator/condenser, a header, the compressor, and a tube,
    wherein said tube comprises a first part comprising a first cross-sectional area and a second part comprising a second cross-sectional area, the second cross-sectional area being greater than the first cross-sectional area,
    wherein the compressor is located entirely inside said first part,
    wherein said second part is connected to the condensation zone of the evaporator/condenser,
    wherein said second part comprises the header or is connected to the header of the evaporator/condenser, and
    wherein the header admits the vapour into the condensation zone.

11. The thermal distillation facility according to claim 1, further comprising a feed-water supply pump, a distillate extraction pump, a concentrate-extraction pump, and a vacuum pump for extracting the non-condensable gases, at least one of said pumps and its motor being situated completely inside the hermetic chamber.

12. The thermal distillation facility according to claim 11, further comprising a concentrate-recirculation pump for transporting the concentrate into the evaporation zone of the evaporator/condenser, said concentrate recirculation pump and its motor being situated completely inside the hermetic chamber.

13. The thermal distillation facility according to claim 12, wherein said distillate extraction pump, said concentrate extraction pump, and said concentrate-recirculation pump and their respective motors are situated completely inside the hermetic chamber.

14. The thermal distillation facility according to claim 11, wherein said feed-water supply pump, said distillate-extraction pump, and said concentrate-extraction pump are coupled to a common mechanism driven by a single motor, wherein incoming and outgoing flow rates are thus continuously in the same proportion, thereby defining the conversion rate of the facility.

15. The thermal distillation facility according to claim 1, wherein the evaporator/condenser comprises a header for admitting vapour into the condensation zone, said header having a total cross-section and an admission cross-section composed of a sum of inlet cross-sections of the condensation zones, the ratio between the cross-section of admission into the condensation zones and the total cross-section of the header being greater than 70%.

16. The thermal distillation facility according to claim 15, wherein the ratio between the cross-section of admission into the condensation zones and the total cross-section of the header is greater than 95%.

17. The thermal distillation facility according to claim 15, wherein the compressor, the header, optionally a tube in which the compressor is located entirely, and the evaporator/condenser are aligned, the header and optionally the tube being able to convey the vapour inside the condensation zone of the evaporator/condenser along a rectilinear axis.

18. The thermal distillation facility according to claim 1, wherein the condensation zone comprises a cross-sectional area that decreases in a direction defined by the vapour stream.

19. The thermal distillation facility according to claim 1, further comprising a heat make-up system for maintaining the temperature inside the hermetic chamber at a constant temperature.

20. The thermal distillation facility according to claim 19, wherein the heat make-up system comprises an electric element.

21. The thermal distillation facility according to claim 12, wherein said feed-water supply pump, said distillate extraction pump, said concentrate-extraction pump, said concentrate-recirculation pump, and said vacuum pump and respective motors of said pumps are situated completely inside the hermetic chamber.

* * * * *